United States Patent [19]

Schmidt

[11] 4,393,714
[45] Jul. 19, 1983

[54] DIFFERENTIAL PRESSURE SENSOR

[75] Inventor: Curt Schmidt, Karlsruhe, Fed. Rep. of Germany

[73] Assignee: Kernforschungszentrum Karlsruhe GmbH, Karlsruhe, Fed. Rep. of Germany

[21] Appl. No.: 323,692

[22] Filed: Nov. 20, 1981

[30] Foreign Application Priority Data

Mar. 7, 1981 [EP] European Patent Off. .... 81101676.5

[51] Int. Cl.³ .............................................. G01L 9/12
[52] U.S. Cl. ...................................... 73/718; 73/729; 361/783
[58] Field of Search ......................... 73/718, 724, 729; 361/283, 282

[56] References Cited

U.S. PATENT DOCUMENTS 2,714,703 8/1955 Ruderfer .............................. 73/718
3,929,019 12/1975 Younkin ................................ 73/724

Primary Examiner—Donald O. Woodiel
Attorney, Agent, or Firm—Spencer & Kaye

[57] ABSTRACT

A differential pressure sensor comprises a housing having first and second inlets; a rod-shaped capacitive displacement sensor affixed to the housing in the interior thereof; a first electrode constituted by an end face of the displacement sensor; a second electrode constituted by a diaphragm extending generally parallel to and at a distance from the first electrode; a bellows affixed to the housing and the diaphragm along a circumference thereof; a first chamber defined within the housing and communicating with the first inlet; and a second chamber defined within the housing and communicating with the second inlet. The first and second chambers are separated fluid tight from one another. One of the faces of the diaphragm is exposed to the pressure of a first fluid admitted to the first chamber through the first inlet and the other face of the diaphragm is exposed to the pressure of a second fluid admitted to the second chamber through the second inlet. As a result, the diaphragm is displaced and the distance from the first electrode is varied as a function of the difference between the pressures of the first and second fluids to vary the capacitance of the capacitive displacement sensor.

8 Claims, 6 Drawing Figures

DIFFERENTIAL PRESSURE SENSOR

BACKGROUND OF THE INVENTION

This invention relates to a differential pressure sensor for use at cryogenic temperatures. The sensor includes a capactive signal generator which is insensitive to magnetic fields and which has electrodes exposed to the pressure difference to be measured. The pressure difference changes the mutual distance d of the electrodes and thus changes the capacity $C = \epsilon_0 \times \epsilon_r \times (F/d)$ of the capacitive transmitter (signal generator) in a predetermined pressure/displacement relationship.

The magnetic fields of fusion reactors with a magnetic inclusion of plasmas can be generated, for economic reasons, only by means of superconducting magnets. For this purpose superconducting cables are used which are build as hollow conductors and cooled with supercritical helium. For reasons of operational safety, the pressure drop of the liquid helium must be measured over a predetermined length of the superconductor to ensure that at all times a sufficient cooling is present and thus an undesired transition from the superconducting state into the normal conducting state cannot occur.

In the periodical entitled Review of Scientific Instruments, April 1980, issue No. 51(4), on pages 509 and 510 there is disclosed a helium vapor pressure gauge for a temperature range down to 0.3 K. The device essentially comprises a measuring condenser whose capacity is altered by moving a diaphragm as an auxiliary electrode towards one of two condenser plates as a function of the gas pressure in a helium chamber closed by the diaphragm.

The above-outlined known measuring device is particularly disadvantageous in that it is complex and expensive to construct a chamber with a diaphragm and further, the development of an appropriate electronic system and a testing in strong magnetic fields would be necessary.

SUMMARY OF THE INVENTION

It is an object of the invention to improve a measuring device of the above-outlined type and to construct the helium pressure measuring sensor with known and long-proven components.

This object and others to become apparent as the specification progresses, are accomplished by the invention according to which, briefly stated, the differential pressure sensor comprises a housing having first and second inlets; a rod-shaped capacitive displacement sensor affixed to the housing in the interior thereof; a first electrode constituted by an end face of the displacement sensor; a second electrode constituted by a diaphragm extending generally parallel to and at a distance from the first electrode; a bellows affixed to the housing and the diaphragm along a circumference thereof; a first chamber defined within the housing and communicating with the first inlet; and a second chamber defined within the housing and communicating with the second inlet. The first and second chambers are separated fluid tight from one another. One of the faces of the diaphragm is exposed to the pressure of a first fluid admitted to the first chamber through the first inlet and the other face of the diaphragm is exposed to the pressure of a second fluid admitted to the second chamber through the second inlet. As a result, the diaphragm is displaced and the distance from the first electrode is varied as a function of the difference between the pressures of the first and second fluids to vary the capacitance of the capacitive displacement sensor.

The advantages achieved by the differential pressure sensor according to the invention reside particularly in that a linear output signal at high sensitivities can be obtained by means of a simple structure formed of proven structural components.

DESCRIPTION OF THE PREFERRED EMBODIMENTS

Figure 1:
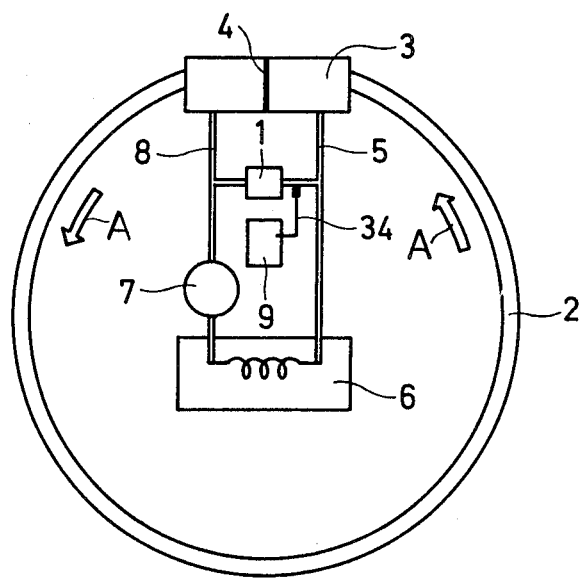
FIG. 1 is a schematic view of a measuring device incorporating a differential pressure sensor according to the invention.

Turning now to FIG. 1, the differential pressure sensor according to the invention is symbolically indicated at 1 and is a component of a schematically illustrated measuring device for measuring the pressure drop of supercritical liquid helium flowing, as shown by the arrows A, in a superconductor 2. The superconductor arrangement 2 comprises a carrier on which the superconductors proper are so arranged that in the jacket cooling channels for the helium are formed. The ends of the circularly bent superconductor arrangement 2 are attached to a coupling block 3 in which each superconductor is short-circuited. By means of a partition 4 in the coupling block 3 the helium flow is directed through an outlet 5, a heat exchanger 6 and a pump 7 to an inlet 8 which is situated at that side of the partition 4 which is oriented away from the outlet 5 and which is connected with the other end of the superconductor arrangement 2. Between the outlet 5 and the inlet 8 of the coupling block 3 there is situated the differential pressure sensor 1 which measures the pressure drop in the superconductor arrangement 2. The signals emitted by the differential pressure sensor 1 are processed by a measuring value processor 9.

The measuring device is situated in a magnetic field of approximately 5 Tesla which extends perpendicularly to the plane of FIG. 1 and which is enclosed in a vacuum vessel. By varying the external magnetic field, a current can be induced in the superconductor arrangement 2.

Turning now to FIG. 1, there is illustrated in section a differential pressure sensor 1 constructed according to a preferred embodiment of the invention. A bar-like capacitive displacement sensor 20 is supported by means of a setscrew 23 in a bore 21 of a housing part 22. The free end of the capacitive displacement sensor 20 projects from the bore 21 and forms with its radial end face an electrode 24 of the capacitive differential pressure sensor 1. A further electrode 25 of the capacitive differential pressure sensor 1 is formed of a disc-like diaphragm which is situated at a distance d from and parallel to the end face 24 and which is connected by means of a bellows 26 helium-tight with the housing part 22. The bellows 26 and the electrode 25 are surrounded by a housing part 27 which has a coupling nipple 28 and which is welded to the housing part 22. On that side of the housing part 22 which is oriented away from the bellows 26 there is arranged a housing part 29 which has a coupling nipple 30 and which is secured to the housing part 22 by means of screws 31. The housing parts 22 and 29 are mutually sealed by an indium seal 32. A plug 33 for coupling the measured value processor 9 is also surrounded by the housing part 29.

Figures 2, 3:
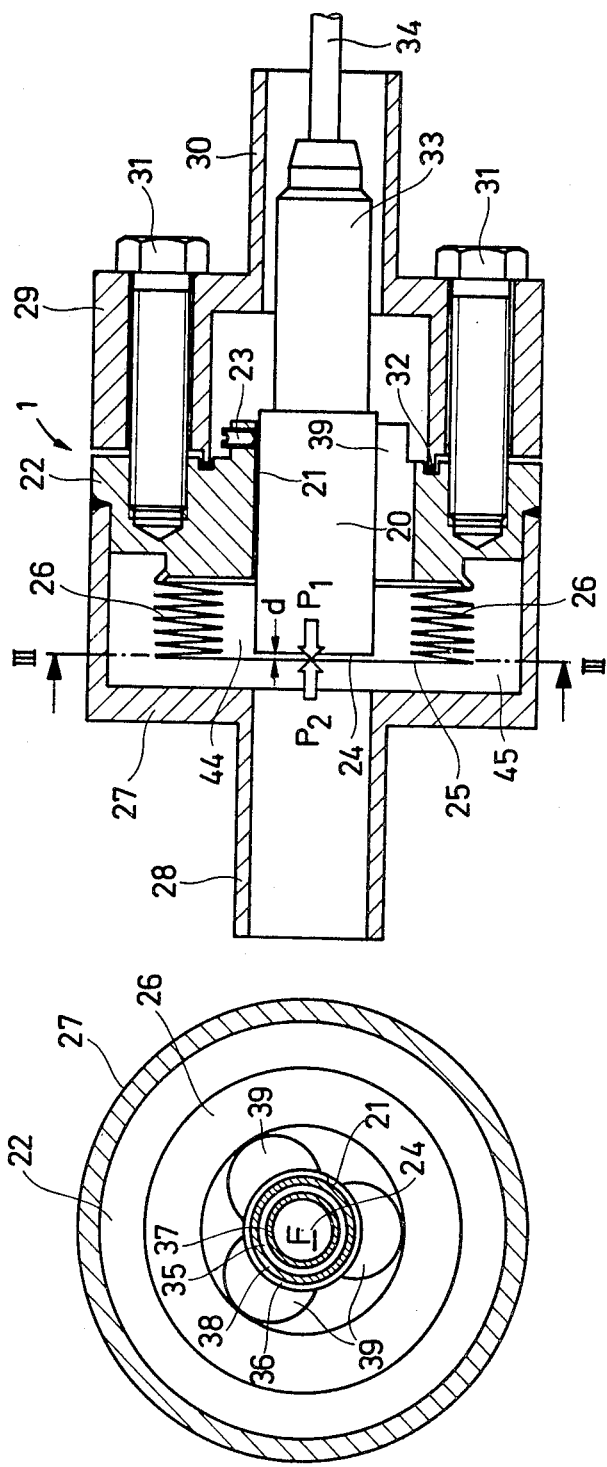
FIG. 2 is an axial sectional view of a preferred embodiment of a differential pressure sensor according to the invention.
FIG. 3 is a sectional view taken along line III—III of FIG. 2.

Referring now in particular to FIGS. 2 and 3, the capacitive displacement sensor 20 is constructed as a protective ring condenser which is coupled by means of a twice-shielded triaxial cable 34 to the measuring value processor 9. The latter, by means of an a.c. voltage of 5 kHz determines the reactance $X_c = 1/j\omega C$ of a condenser whose capacity is $C = \epsilon_o \times \epsilon_r \times F/d$. This condenser is formed by the electrode 24 having a circular surface F and by the electrode 25 which is situated at a distance d from the surface F. If $\epsilon_o$ is the dielectric constant in vacuum and the relative dielectric constant for liquid helium at 4.2 K is $\epsilon_r = 1.048$, then $X_C = \text{const.} \times d$.

The end face of the displacement sensor 20 is formed of the electrode 24 having the circular surface F, a protective ring 35 and a protective ring 36. The two rings 35 and 36 are electrically insulated from one another by means of insulating rings 37 and 38.

The protective ring 35 connected to the measured value processor 9 with the intermediary of the first screen of the triaxial cable 34 is electronically continuously maintained at the potential of the electrode 24 so that capacity changes of the triaxial cable 34 for example, because of changes in position, do not affect the measuring results. The protective ring 36 is grounded.

The housing part 22 supporting the displacement sensor 20 has three connecting channels 39 which are distributed uniformly about the central bore 21 and which connect the coupling nipple 30 with a chamber 44 which is surrounded by the bellows 26 and which includes the space of width d between the electrodes 24 and 25. The bellows 26 is surrounded by a chamber 45 which communicates with the coupling (inlet) nipple 28.

Figure 4:
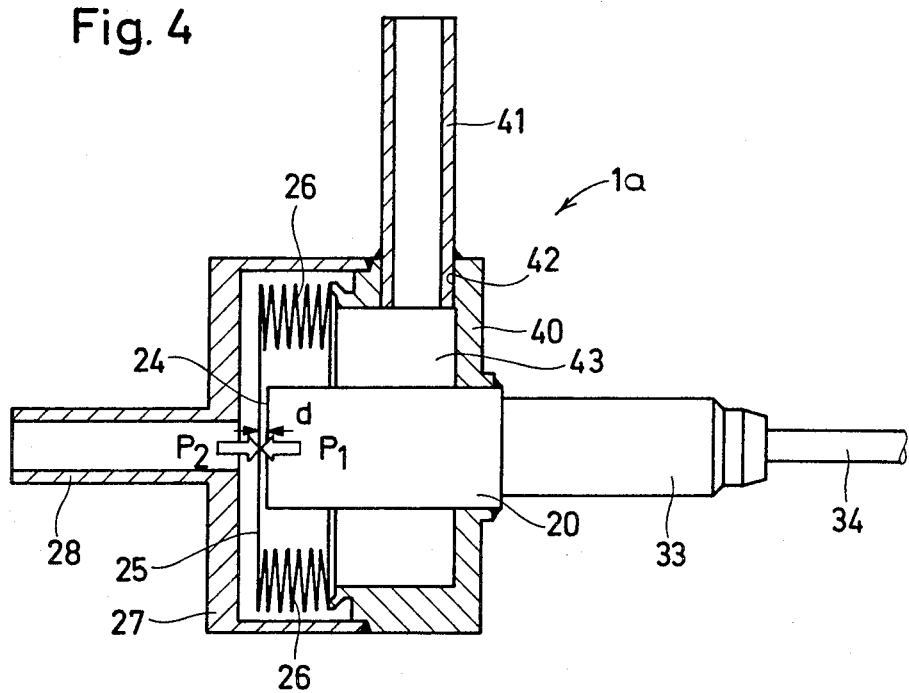
FIG. 4 is an axial sectional view of another preferred embodiment of a differential pressure sensor according to the invention.

FIG. 4 illustrates a differential pressure sensor 1a which is another preferred embodiment of the invention. In this embodiment the capacitive displacement sensor 20 is welded to a housing part 40 in a helium-tight manner and the plug 33, together with the triaxial cable 34 is arranged externally of the helium flow. A coupling nipple 41 is welded into a radial port 42 of the housing part 40 in a helium-tight manner and merges into an annular coupling channel 43.

Figure 5:
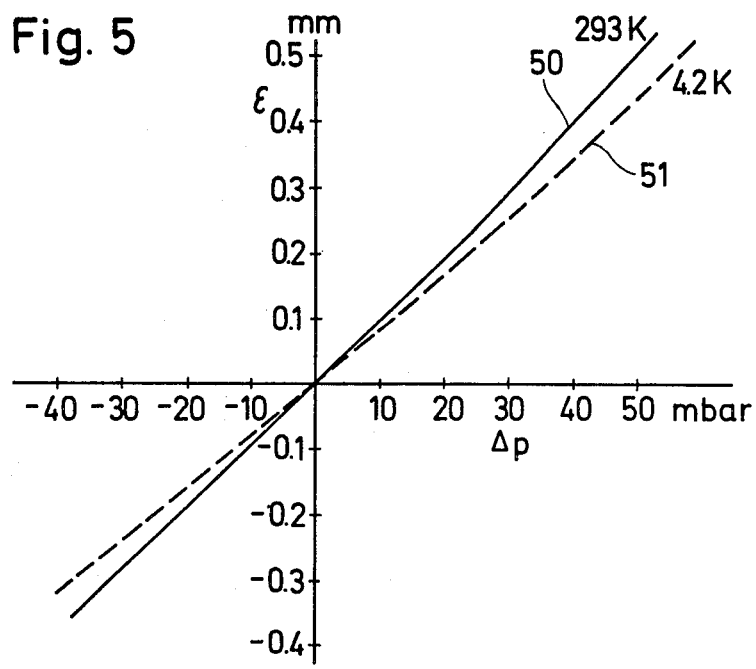
FIG. 5 is a diagram illustrating a calibration curve of a differential pressure sensor according to the invention for excursions in the millimeter range.

Turning now to FIG. 5, there is shown a calibrating curve 50 at 293 K and a calibrating curve 51 at 4.2 K for excursions $\epsilon$ in the millimeter range of the electrode 25, as a function of the differential pressure $\Delta p = p_1 - p_2$ millibar exerted on the electrode 25.

Figure 6:
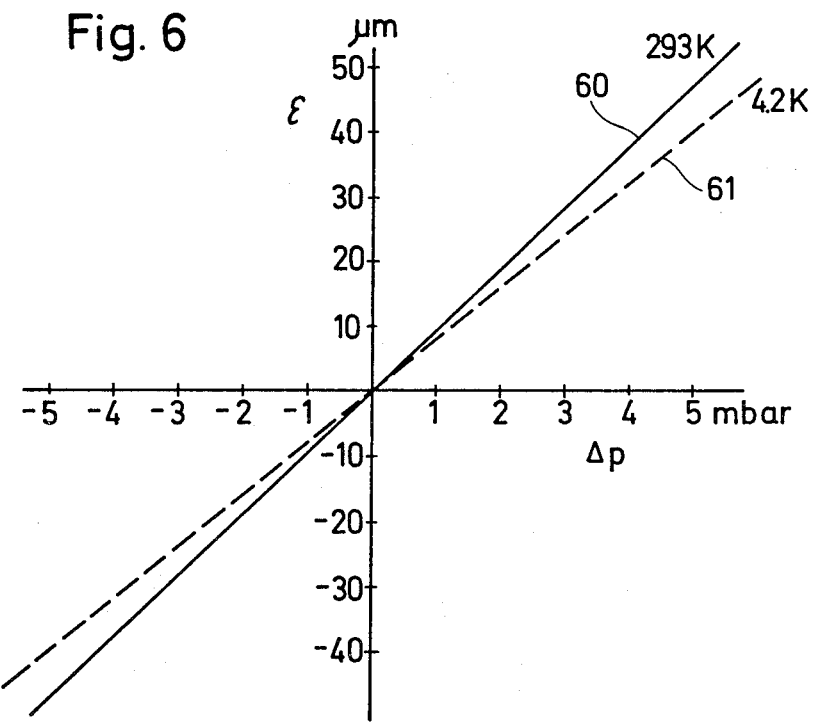
FIG. 6 is a diagram illustrating a calibration curve of a differential pressure sensor according to the invention for excursions in the micron range.

Turning now to FIG. 6, there is shown a calibrating curve 60 at 293 K and a calibrating curve 61 at 4.2 K for excursions $\epsilon$ in the micron range as a function of differential pressure $\Delta p$ in millibar.

For obtaining each graph shown in FIGS. 5 and 6, there is plotted the measured excursion of the electrode 25 of the measuring condenser from the zero position in response to the differential pressure measured by a precision gauge. Positive $\Delta p$ means that the pressure $p_1$ exerted on that side of the electrode 25 which is oriented towards the displacement sensor 20 is greater than the pressure $p_2$ exerted on the other side of the electrode 25.

In an exemplary structure of a differential pressure sensor according to the invention the effective bellows cross section was, for example, 3.7 cm$^2$ and the spring constant at room temperature was 3.85 N/mm. This yielded a measuring range of 3.85 N/3.7 cm$^2$ which equals approximately 100 millibar at an excursion of 1 mm.

Dependent upon the setting of the distance d of the electrodes 24 and 25 pressure differences $\Delta p$ in both directions or only in a single direction may be measured.

The measuring range may be set by the selection of the bellows 26 and/or the displacement sensor 20 in a predetermined manner.

The linearity of the curves is in essence determined by the characteristic of the bellows. Upon compressing the bellows ($-\Delta p$) the linearity of the $\epsilon(\Delta p)$ curve is 0.6% over the range of 100 millibar. The hysteresis amounts to 0.8%. Upon expansion of the bellows ($+\Delta p$) the calibrating curve shows a greater deviation from linearity.

The spring constant of the bellows 26 and thus the calibrating curve are temperature-dependent. Below approximately 20 K, however, the spring constant no longer changes so that in applications at cryogenic temperature conditions no temperature dependence exists.

The delay of response is determined by the natural frequency of the bellows which, at room temperature is 225 Hz and at 4.2 K is 245 Hz.

The magnetic field-independent indication is of particular importance because in use at cryogenic temperatures in many instances powerful magnetic fields are present.

A magnetic field-independent indication is achieved by making the differential pressure sensor of non-magnetic materials.

The differential pressure sensor was tested in an environment of an external magnetic field of 2 Tesla. The change in the indication caused by the magnetic field was less than 0.2 millibar. The output signal was 96 mV/millibar. Because of the high stability of the output signal, the resolution was found to be better than $10^{-6}$ bar.

It will be understood that the above description of the present invention is susceptible to various modifications, changes and adaptations and the same are intended to be comprehended within the meaning and range of equivalents of the appended claims.

What is claimed is:

1. A differential pressure sensor comprising in combination:
    (a) a housing including means defining first and second inlets;
    (b) a rod-shaped capacitive displacement sensor affixed to said housing in the interior thereof;
    (c) a first electrode constituted by an end face of said displacement sensor;
    (d) a second electrode constituted by a diaphragm extending generally parallel to and at a distance from said first electrode; said diaphragm having opposite faces;

(e) a bellows affixed to said housing and said diaphragm along a circumference thereof;

(f) a first chamber defined within said housing and communicating with said first inlet; and (g) a second chamber defined within said housing and communicating with said second inlet; said first and second chambers being separated fluid tight from one another; one of said faces of said diaphragm being exposed to the pressure of a first fluid admitted to said first chamber through said first inlet and the other of said faces of said diaphragm being exposed to the pressure of a second fluid admitted to said second chamber through said second inlet, whereby said diaphragm is displaced and said distance from said first electrode is varied as a function of the difference between the pressures of said first and second fluids to vary the capacitance of said capacitive displacement sensor.

2. A differential pressure sensor as defined in claim 1, wherein said housing comprises a first housing part supporting said capacitive displacement sensor and said bellows and a second housing part surrounding said bellows and said diaphragm and being connected fluid tight with said first housing part.

3. A differential pressure sensor as defined in claim 2, wherein said first chamber is surrounded by said bellows; said first housing part having a channel maintaining communication between said first inlet and said first chamber.

4. A differential pressure sensor as defined in claim 2, wherein said first housing part has a central opening accommodating said displacement sensor and said first housing part further has a plurality of channels surrounding said central opening and maintaining communication between said first inlet and said first chamber.

5. A differential pressure sensor as defined in claim 2, further comprising a third housing part arranged at a side of said first housing part remote from said bellows; said third housing part being connected fluid tight to said first housing part.

6. A differential pressure sensor as defined in claim 5, wherein said first and second inlets comprise, respectively, first and second inlet nipples carried, respectively, by said third and second housing parts.

7. A differential pressure sensor as defined in claim 2, wherein said capacitive displacement sensor is connected fluid tight to said first housing part; said first housing part having a side wall; said first inlet comprising an inlet nipple carried by said side wall of said first housing part.

8. A differential pressure sensor as defined in claim 7, wherein said inlet nipple is connected fluid tight to said side wall of said first housing part.

* * * * *